United States Patent [19]
Wahlquist

[11] Patent Number: 4,524,307
[45] Date of Patent: Jun. 18, 1985

[54] CONVERGENCE CONTROL SYSTEM FOR MULTIGUN CRT

[75] Inventor: Clayton C. Wahlquist, West Valley City, Utah

[73] Assignee: Tektronix, Inc., Beaverton, Oreg.

[21] Appl. No.: 368,780

[22] Filed: Apr. 15, 1982

Related U.S. Application Data

[63] Continuation-in-part of Ser. No. 349,507, Feb. 17, 1982, abandoned.

[51] Int. Cl.$^3$ .................................... H01J 29/70
[52] U.S. Cl. ................................... 315/368
[58] Field of Search ............ 315/368, 382, 370

[56] References Cited

U.S. PATENT DOCUMENTS

| | | | |
|---|---|---|---|
| 3,501,669 | 3/1970 | Henderson | 315/370 |
| 3,891,889 | 6/1975 | Fazio | 315/368 |
| 3,942,067 | 3/1976 | Cawood | 315/368 |

*Primary Examiner*—Theodore M. Blum
*Assistant Examiner*—Gregory Issing
*Attorney, Agent, or Firm*—John Smith-Hill

[57] ABSTRACT

A convergence control system suited for use with high resolution color display monitors or color television receivers. The system includes both primary and secondary convergence controls having minimal interaction between them. An exemplified convergence control system comprises circuitry designed to develop output signal waveforms for implementing the following expression:

$$Cc(X) = K \pm K1(X^3 - X) \pm K2(X^4 - X^2) \pm \begin{cases} K3X^2 \text{ for } X \leq 0 \\ K4X^2 \text{ for } X \geq 0 \end{cases}$$

where X is a horizontal deflection-related signal input to the system, K is a static control for adjusting convergence at the center of the CRT screen, K3 and K4 are left and right side convergence controls, and K1 and K2 are secondary controls for correcting residual misconvergence—i.e., misconvergence at areas of the screen intermediate the areas converged using the K, K3 and K4 controls. A similar system is provided for providing vertical deflection-related convergence waveforms.

6 Claims, 11 Drawing Figures

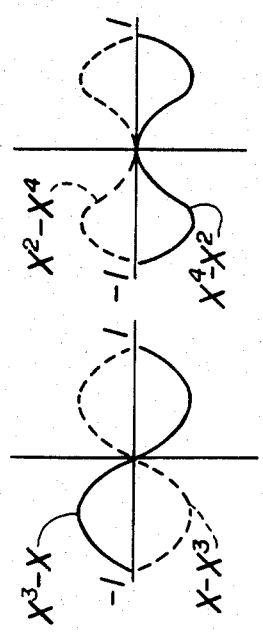
FIG. 2A
FIG. 2C
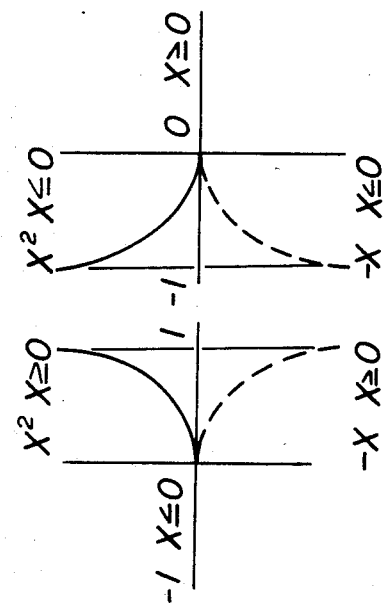
FIG. 2B
FIG. 2D
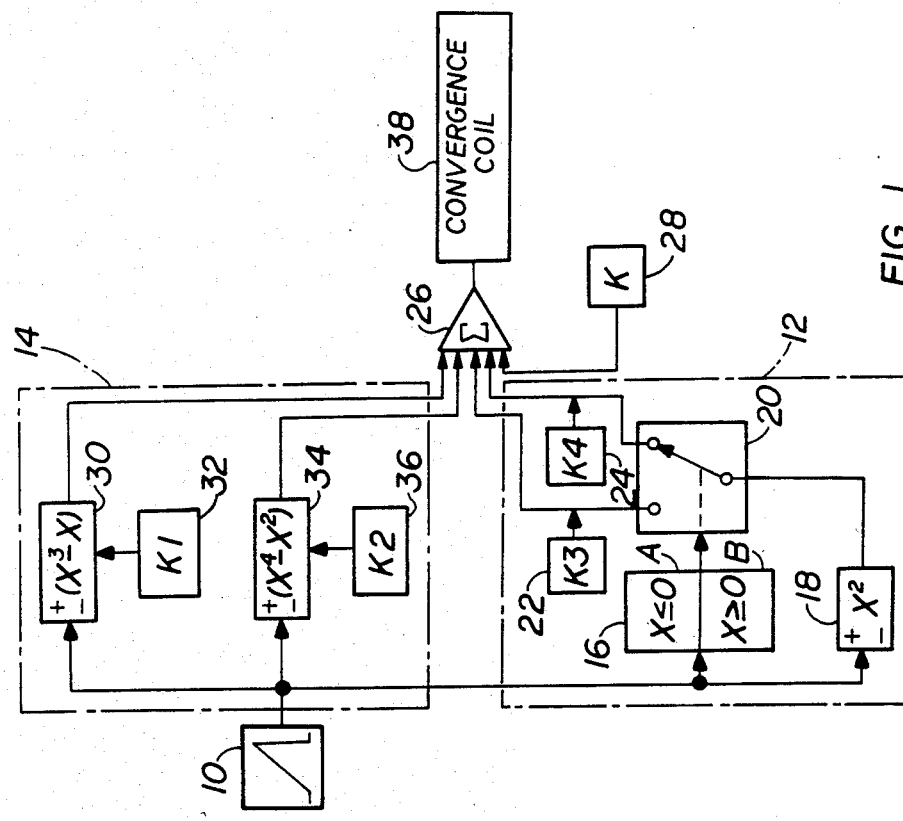
FIG. 1

CONVERGENCE CONTROL SYSTEM FOR MULTIGUN CRT

CROSS-REFERENCE TO RELATED APPLICATION

This is a continuation-in-part of application Ser. No. 349,507, filed Feb. 17, 1982 now abandoned.

FIELD OF THE INVENTION

The present invention relates to cathode-ray tube (CRT) deflection systems, and more particularly to an improved convergence system suitable for high resolution color CRTs of the type used in large screen color picture monitors and television receivers.

DESCRIPTION OF THE PRIOR ART

Color CRTs of the type used in most present-day television and similar color image display systems typically have three electron guns—one for each of three primary colors (red, green and blue). The guns are arranged symmetrically with respect to the central axis of the tube, and generate individual electron beams that pass through small holes or slits in a shadow mask (or aperture grill) positioned between the guns and a cathodoluminescent display screen. The display screen is formed of three color phosphors deposited in a regular pattern of dots or strips on the inner face of the CRT. The arrangement of the phosphor deposits and shadow mask apertures is such that, ideally, each electron beam strikes only the deposits of its respective color. A common electromagnetic deflection yoke positioned between the electron guns and the screen deflects the three beams over the screen surface.

To produce color images correctly, the three electron beams must be coincident, or converged, at the center of the screen, and must remain coincident as they are deflected over its surface. Static convergence—i.e., convergence at screen center in the absence of a deflecting field—is achieved using fixed magnetic fields from suitable external magnets. In addition, variable or "dynamic" magnetic fields must be applied to each beam to correct for misconvergence as the beams are deflected away from the tube's central axis. Such misconvergence results from off-axis positioning of the electron guns and the increasing distance the beams must travel as they are deflected away from the center of the relatively flat display screen. In entertainment-type color television receivers, the dynamic correction fields typically have been produced by intergrating the horizontal and vertical deflection waveforms to obtain an approximation of a parabolic waveform, which is then offset to correct for the non-symmetrical nature of the correction. More precise convergence adjustment is needed to eliminate color fringing in large screen, high resolution color CRTs of the type now used in commercial color monitors and computer displays.

More advanced convergence systems implement a sector type of control. For example, in addition to the usual static convergence controls, a set of controls is provided for converging the red, green and blue beams at eight additional points on the display screen: center top, center bottom, center right, center left, and at each of the four corners. After the beams are converged at each of these nine "primary" points, however, a certain amount of misconvergence or color fringing may be present in regions of the screen lying between those points. This so-called "residual" misconvergence should be reduced to an absolute minimum in high quality color displays used for critical monitoring or other applications where highly accurate color reproduction is important.

Most conventional analog convergence systems for color CRTs approximate the required dynamic correction fields (and hence the current waveforms applied to the convergence correction coils associated with each electron gun) using sums of linear functions, or ramps, and square functions, or parabolas. Thus, for example, if beam deflection in the horizontal plane is assigned the variable X, with X=0 being at the center of the screen, X=1 representing maximum deflection in one direction (e.g., to the right) and X=−1 representing maximum deflection in the opposite direction (to the left), then such a convergence correction waveform Cc(X) is given by the equation:

$$Cc(X) = AX + BX^2 \quad (1)$$

Some prior art systems provide controls for varying the constants A and B to adjust convergence. Other systems approximate equation (1) using the following expression:

$$Cc(X) = \begin{cases} DX^2 \text{ for } X \leq 0 \\ EX^2 \text{ for } X \geq 0 \end{cases} \quad (2)$$

This permits independent control of convergence at the right and left sides of the screen. The X=−1 and X=1 points are converged individually by varying the values of D and E, respectively, after the X=0 center point is converged using the static convergence controls.

SUMMARY OF THE INVENTION—

The higher resolution color CRTs now available require better over-all convergence than can be achieved with such prior art systems. One possibility for improvement would be to implement a convergence function having higher order terms, such as:

$$Cc(X) = AX + BX^2 + FX^3 + GX^4 \quad (3)$$

While capable of providing higher convergence accuracy, such a system would be difficult and time-consuming to use because of interactions among the various controls. Thus, the values of F and G could not be adjusted to correct residual misconvergence without affecting the settings of the primary (A and B) convergence controls, and vice versa. The resulting iterative procedure would be tedious, repetitive and, because of the time required, very costly on a service basis.

The present invention provides a convergence function having terms for the correction of residual misconvergence that do not interact with those used to adjust convergence at the previously-mentioned primary points. Such a function is exemplified by the expression:

$$Cc(x) = K \pm K1(X^3 - X) \pm K2(x^4 - X^2) \pm \begin{cases} K3X^2 \text{ for } X \leq 0 \\ K4X^2 \text{ for } X \geq 0 \end{cases} \quad (4)$$

wherein X represents a ramp input signal, K is a static, center screen control value, K3 and K4 are control values for the left and right sides, respectively, of the display screen, and K1 and K2 are "secondary" control values for correcting residual misconvergence in areas between the left, center and right "primary" points. As will be understood, the terms $(X^3-X)$ and $(X^4-X^2)$ are both zero for $X=-1$, 0 and $+1$. Adjustment of the secondary controls thus has no effect on convergence at the extreme left and right sides and at the center of the screen. Implementation of an equivalent convergence correction function in the vertical or Y direction provides a similar advantage with respect to the top, center and bottom of the screen.

The terms $(X^3-X)$ and $(X^4-X^2)$ may be replaced in equation (4) by their negative equivalents, $-(X^3-X)=(X-X^3)$ and $-(X^4-X^2)=(X^2-X^4)$. For optimum flexibility, a convergence system according to the present invention preferably provides means for implementing both the positive and negative versions of these secondary correction terms, which affect the symmetry or straightness of the lines in a displayed cross-hatch pattern.

BRIEF DESCRIPTION OF THE DRAWING

The present invention will become more fully understood from the following detailed description and the accompanying drawing, wherein:

FIG. 1 is a functional block diagram of a convergence control system according to the present invention;

FIGS. 2A-2D depict the convergence correction waveforms produced by the FIG. 1 system;

DETAILED DESCRIPTION

Figure 3A:
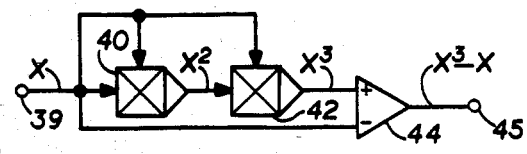
FIGS. 3A-3B illustrate in block diagram form circuitry for generating the waveforms shown (in solid line) in FIGS. 2A and 2B.

Referring now to the drawings, and first of all to FIG. 1, a convergence control system according to the present invention is shown to include a horizontal ramp, or sawtooth, signal generator 10. The ramp output signal (X) from generator 10 is applied as an input to circuits within the system's primary and secondary convergence control sections 12 and 14, respectively. In primary control section 12, the X signal is applied to a sector detection circuit 16 that includes a left side ($X \leq 0$) detector 16a and a right side ($X \geq 0$) detector 16b. The ramp signal also is applied to a multiplier 18 to obtain a squared output signal $X^2$, which is coupled to the input of a switching circuit 20. The switching circuit divides the $X^2$ parabola from multiplier 18 into separate left and right half parabolas under the control of sector detection circuit 16. The two half parabolas from circuit 20 are applied to two inputs of a summing circuit 26. Separate K3 and K4 amplitude controls 22 and 24, respectively, are provided for varying the amplitude of the convergence correction signals from section 12. The primary convergence controls are completed by a variable amplitude DC source 28, the output of which is applied as an input to summing circuit 26. As indicated in the figure, source 28 serves as a K control in the convergence control system.

In secondary control section 14, the X ramp signal is supplied to the inputs of a first function generator 30 that provides a $\pm(X^3-X)$ or 'S' output waveform, and a second function generator 34 that provides a $\pm(X^4-X^2)$ or 'B' output waveform. The outputs of generators 30 and 34, adjustable in amplitude via K1 and K2 controls 32 and 36, are also applied as inputs to summing circuit 26. The summing circuit provides an output signal representative of the sum of the inputs, which include a DC level from K source 28, half parabolas from switching circuit 20, and 'B' and 'S' secondary convergence waveforms from function generators 30 and 34. The summed output is fed to a convergence coil 38 to effect the desired convergence control.

The output waveforms from function generators 30, 34 and from switching circuit 20 are illustrated graphically in FIG. 2. Thus, FIG. 2A depicts the 'S' secondary convergence correction function $X^3-X$ in solid line and its negative equivalent $X-X^3$ in broken line. FIG. 2B similarly shows the 'B' secondary correction function $X^4-X^2$ in solid line and its negative equivalent $X^2-X^4$ in broken line. As will be understood, the polarity and amplitude of both waveforms is determined by the setting of controls 32 and 36. It should be noted that the FIGS. 2A and 2B functions are both zero for values of $X=-1$ and $X=+1$, as well as for $X=0$. Thus, variations in either the amplitude or the polarity will not affect convergence at those three points, which represent the extreme left and right sides and the center of the CRT display screen. FIG. 2C illustrates the primary convergence correction function $$\begin{bmatrix} \pm X^2 \text{ for } X \geq 0 \\ 0 \text{ for } X \leq 0 \end{bmatrix}$$

for the right side of the screen, while FIG. 2D depicts the corresponding left side correction function $$\begin{bmatrix} \pm X^2 \text{ for } X \leq 0 \\ 0 \text{ for } X \geq 0 \end{bmatrix}.$$

These half parabolas are produced by timed switching of the output parabola from multiplier 18. The remaining primary correction function K is provided by DC source 28, as previously noted. Convergence at the center of the screen is adjusted using the K control.

The FIG. 1 convergence control system thus implements the correction function:

$$Cc(X) = K \pm K1(X^3 - X) \pm K2(X^4 - X^2) \pm \begin{cases} K3X^2 \text{ for } X \leq 0 \\ K4X^2 \text{ for } X \geq 0 \end{cases}$$

The primary convergence controls (K, K3 and K4) are set to provide optimum convergence at the center and the far left and right sides of the display screen. The secondary controls (K1 and K2) then are used to eliminate residual misconvergence in areas of the screen intermediate the primary regions. Because, as noted earlier, the secondary convergence correction waveforms have zero amplitude at the $X=0$ and $\pm 1$ primary adjustment points, regardless of the settings of the K1 and K2 controls, interaction with the primary controls is effectively eliminated.

Figure 3B:
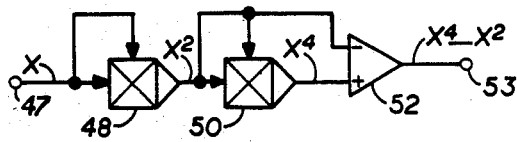

Referring now to FIG. 3, a simplified circuit for generating the $X^3-X$ or 'S' secondary convergence correction waveform is shown in FIG. 3A. A ramp or sawtooth signal X is applied via an input terminal 39 to both input terminals of a multiplier 40, suitably a so-called Gilbert multiplier as disclosed in U.S. Pat. No. 3,689,752. An essential characteristic of such a multiplier is that its output is proportional to the product of the signals applied to its two inputs. The $X^2$ output from multiplier 40 is applied as an input to a similar multiplier 42 having its other input connected to receive the ramp signal from terminal 39. The input ramp signal then is subtracted from the $X^3$ output from multiplier 42 by a differential amplifier 44 to provide an $X^3-X$ signal at an output terminal 45. As will be evident, the negative version of the correction function—i.e., $X-X^3$—can be obtained by reversing the inputs to differential amplifier 44.

The 'B' convergence correction waveform $X^4-X^2$ can be generated using the same components connected in a different manner. Thus, a ramp signal applied to an input terminal 47 is squared by a multiplier 48, the output of which is again squared by a second multiplier 50. The $X^2$ output of multiplier 48 then is subtracted by a differential amplifier 52 from the $X^4$ output of multiplier 50 to provide an $X^4-X^2$ signal at an output terminal 53. Again, the negative version ($X^2-X^4$) of the correction function can be obtained by reversing the inputs to the differential amplifier.

Figure 4:
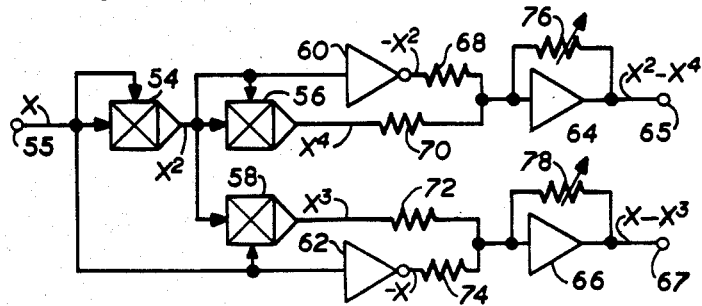
FIGS. 4 and 5 illustrate alternative circuitry for generating the FIGS. 2A and 2B waveforms.

An alternative circuit for generating both secondary convergence correction waveforms is shown in FIG. 4. A ramp input signal X is applied via an input terminal 55 to both inputs of a first multiplier 54. The $X^2$ output of the first multiplier then is applied to both inputs of a second multiplier 56 to provide an $X^4$ output signal that is coupled to the input of a first operational amplifier 64 via a resistor 70. The $X^2$ output of multiplier 54 also is connected to the input of a first inverter 60, the $-X^2$ output of which is coupled to the input of co-amp 64 by a resistor 68. A feedback variable resistor 76 bridging the input and output of amplifier 64 controls the amplitude of the resulting $X^2-X^4$ correction signal connected to an output terminal 65. A third multiplier 58 combines the X input signal with the $X^2$ output of multiplier 54 to provide an $X^3$ signal that is coupled to the input of a second operational amplifier 66 by a resistor 72. The input ramp also is applied to the input of a second inverter 62, the $-X$ output of which is coupled via a resistor 74 to the input of op-amp 66. The amplitude of the resulting $X-X^3$ output signal from amplifier 66, controlled by a feedback variable resistor 78, is connected to output terminal 67.

Figure 5:
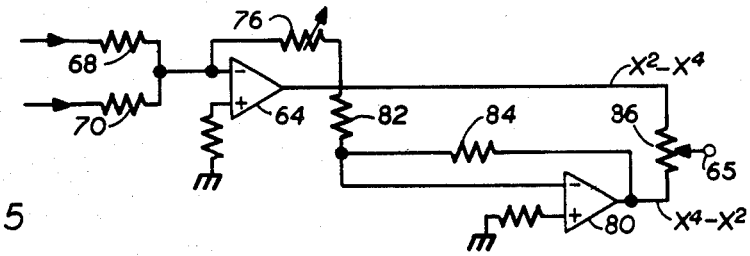

As will be understood, it is desirable to provide both positive and negative versions of the 'S' and 'B' secondary convergence correction waveforms so that any type of residual misconvergence can be corrected. This can be accomplished by modifying the output portions of the FIG. 4 circuit as shown in FIG. 5. A unity gain inverting amplifier formed by an operational amplifier 80 and identical input and feedback resistors 82 and 84, respectively, is used to invert the output from op-amp 64. The inverted ($X^4-X^2$) and non-inverted ($X^2-X^4$) signals are then connected to opposite ends of a potentiometer 86, the slider of which is connected to output terminal 65. When the slider is moved to one end of the potentiometer's resistance element—i.e., the upper end in the figure—the signal at terminal 65 will be of the form $X^2-X^4$. As the slider is moved toward the center of potentiometer 86, the output signal amplitude gradually decreases to zero. Past the center point, the output signal has the form $X^4-X^2$ and increases in amplitude until the slider reaches the opposite (bottom) end of the resistance element. The same modification may be added to the output of op-amp 66 (FIG. 4) to provide both $X-X^3$ and $X^3-X$ correction signals.

Figure 6:
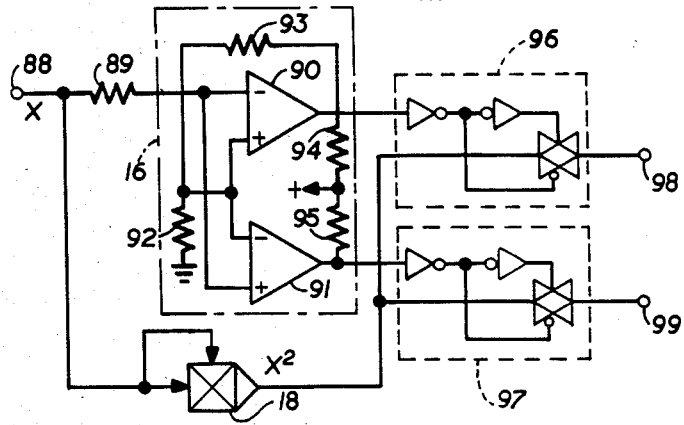
FIG. 6 illustrates circuitry for generating the waveforms shown in FIGS. 2C and 2D.

The half parabola signals shown in FIGS. 2C and 2D may be provided using the circuit arrangement shown in FIG. 6. A ramp signal X applied to input terminal 88 is coupled via a resistor 89 to a sector detection circuit 16 comprising first and second comparators 90 and 91 and resistors 92 through 95, connected as shown. The two comparators produce a pair of complimentary square wave output signals with transitions at the beginning and the midpoint of the ramp input signal. The ramp signal also is applied to both input terminals of a multiplier 18 to obtain a positive-going parabola ($X^2$) output signal, which is fed to the inputs of first and second bilateral electronic switches 96 and 97. The outputs of comparators 90 and 91 are applied to the control terminals of switches 96 and 97, respectively, which form switching circuit 20 of FIG. 1. From the beginning to the midpoint of the input ramp ($X \leq 0$), comparator 90 provides a logical HIGH output signal that closes switch 96 and allows the first half of the $X^2$ parabola to pass through to terminal 98. Comparator 91 has a LOW output during this time, and switch 97 remains open. At the midpoint of the ramp (corresponding to the center of the display screen), the output signals from both comparators reverse to open switch 96 and simultaneously close switch 97, routing the second half of the parabola to terminal 99. Variable attenuators 22 and 24 (FIG. 1) at the outputs of switches 96 and 97 control the amplitude of the correction waveforms. Suitable means (not shown) also is provided to invert the output signals to provide the negative-going half parabolas shown in FIGS. 2C and 2D.

Figure 7:
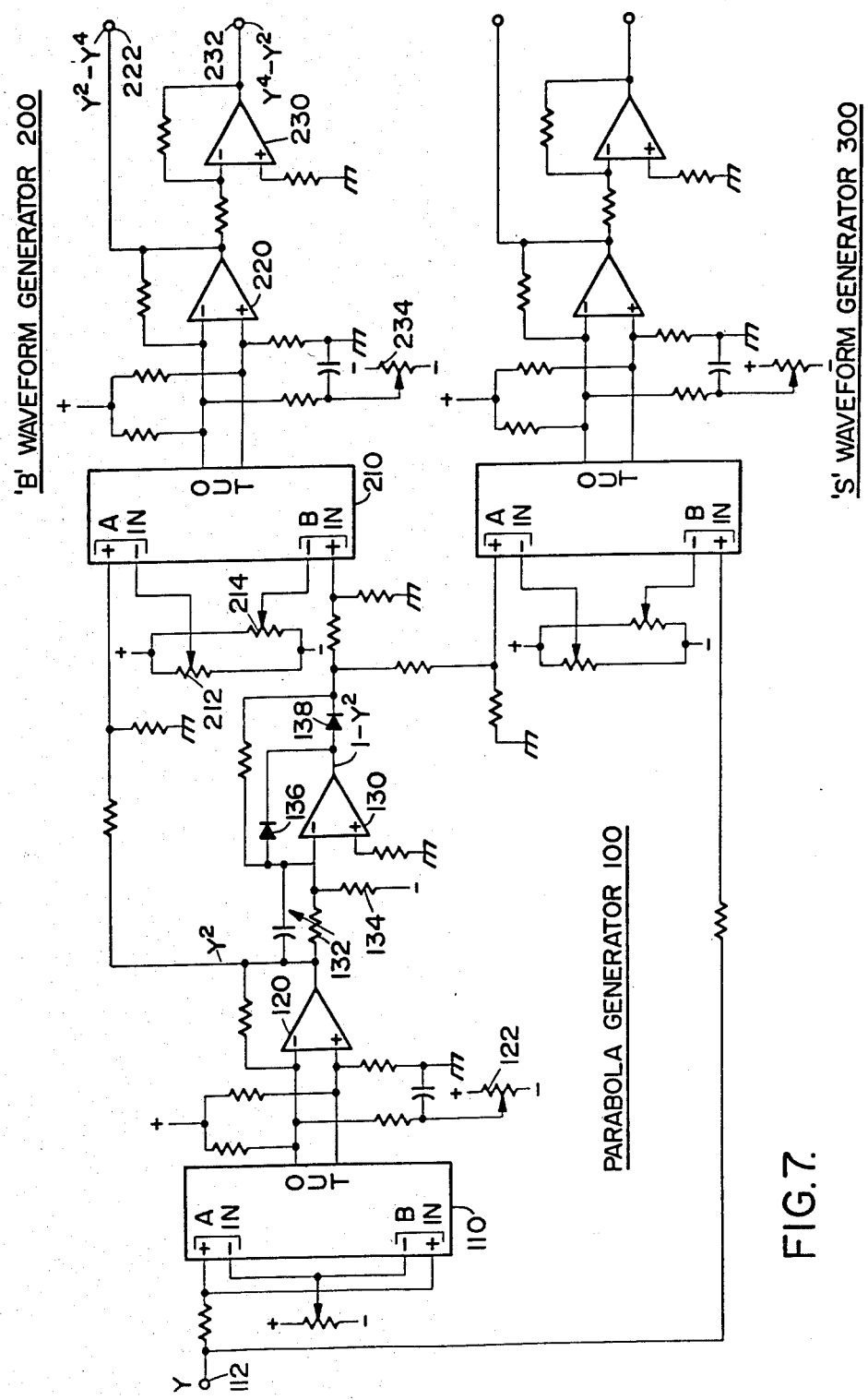
FIG. 7 is a schematic diagram of a secondary convergence correction signal generator according to a preferred embodiment of the invention.

A secondary convergence correction signal generator according to the best mode presently contemplated for the practice of the invention is shown in FIG. 7. In the form shown, the FIG. 7 circuit provides vertical axis correction signals $\pm(Y^4-Y^2)$ and $\pm(Y^3-Y)$. As those of ordinary skill in the art will appreciate, similar circuitry may be used to provide corresponding horizontal axis signals. A high resolution color picture monitor, television receiver or the like desirably would include both vertical and horizontal secondary convergence correction signals, as well as the usual primary correction signals for screen center (X=0, Y=0), extreme right and left center (X±1, Y=0), extreme top and bottom center (X=0, Y=±1) and the four corners (X=±1, Y=±1) of the display screen. The four corner signals may be generated in a manner to be described below.

The convergence signal generator of FIG. 7 converts a vertical ramp signal into parabola, 'B'-shaped and 'S'-shaped waveforms. The ramp signal is derived from the monitor's raster generating circuitry, so that the convergence waveforms are referenced to beam position on the CRT screen. Parabola signal generator 100 includes, as its core element, a four quadrant multiplier 110. This device, which is available commercially as a Motorola MC1495 microcircuit, multiplies two pairs of differential inputs and produces a pair of differential output currents that are proportional to the product of the multiplication. A vertical ramp signal applied to Y input terminal 112 is fed to the positive sides of the multiplier's A and B inputs and summed with a DC offset level applied to the negative sides of both differential inputs. The offset level is set so that the null points of the positive- and negative-going parabolas produced by generator 100 occur at the same time as the zero volts point (vertical center of the CRT screen) of the vertial ramp.

The differential parabolic outputs of multiplier 110 are applied to the inputs of an operational amplifier 120, which converts them to a single, positive-going parabola $Y^2$. An offset adjustment potentiometer 122 sets the DC level of the output parabola so that its null point is at zero volts. A second operational amplifier 130 inverts the $Y^2$ parabola, creating a negative-going and DC-shifted $1-Y^2$ parabola at its output. Variable input resistor 132 adjusts the gain of op-amp 130 and thus determines the amplitude of the output parabola with respect to a DC offset level set by resistor 134. With bridging diode 136 conducting and series output diode 138 turned off, the DC offset level produces a voltage limit of approximately 0 V. for the output parabola. Resistor 132 is then adjusted so the most negative portions of the parabola (the "horns") just reach this point. Op-amps 120 and 130 are conventional devices available in integrated circuit form from a variety of commercial sources.

Vertical 'B' waveform generator 200 also includes a four quadrant multiplier 210 as its main component. The positive-going ($Y^2$) parabola from op-amp 120 is applied to the +A input of multiplier 210, and the inverted and level-shifted negative-going ($1-Y^2$) parabola from op-amp 130 is applied to the multiplier's +B input. DC offset potentials are applied to the −A and −B inputs by potentiometers 212 and 214, respectively. These potentiometers adjust the DC levels of the input parabolas, thus allowing symmetry adjustment of the multiplier's output waveforms. The output from multiplier 210 is a differential pair of 'B'-shaped waveforms that are applied to the input of operational amplifier 220. Amplifier 220 produces a single, positive-going 'B' waveform ($Y^2-Y^4$) that is made available at output terminal 222. A second op-amp 230 inverts and shifts and output signal from amplifier 220, creating a negative-going, DC-shifted 'B' waveform ($Y^4-Y^2$) that is made available at output terminal 232. Potentiometer 234 allows adjustment of the overall DC level of the output signals at terminals 222 and 232.

The architecture and operation of the vertical 'S' waveform generator 300 is essentially identical with that of 'B' waveform generator 200. In the case of generator 300, a Y ramp signal from input terminal 112 is multiplied by a parabola from op-amp 130 to create 'S' shaped waveforms ($Y^3-Y$) at output terminal 302 and ($Y-Y^3$) at output terminal 304.

Corner convergence signals may be provided using a circuit essentially identical with those of waveform generators 200 and 300. In this case, however, a $Y^2$ vertical parabola signal from the output of op-amp 120 would be applied to the +A input of a four quadrant multiplier, and an $X^2$ horizontal parabola would be applied to the multiplier's +B input. The resulting output signal from the corner convergence circuit would have the form ($Y^2X^2$).

As will be understood, horizontal 'B' and 'S' secondary convergence waveforms may be generated using circuitry similar to that of FIG. 7. The only significant difference would be the addition of a blanking transistor to block the horizontal ramp retrace spike from appearing on the inverted and shifted horizontal parabola produced by an op-amp equivalent to amplifier 130 in FIG. 7. For example, the emitter of a suitable NPN transistor would be connected to the op-amp's (−) input, and the transistor's collector would be connected to the amplifier's output terminal. The base of the NPN device would be connected to receive horizontal retrace blanking signals from the instrument's deflection circuitry.

As described above, a secondary convergence control system according to the invention features the use of correction waveforms $\pm(X^3-X)$, $\pm(X^4-X^2)$, $\pm(Y^3-Y)$ and $\pm(Y^4-Y^2)$ having minimal effect on the primary convergence signals. It will be apparent that the specific circuits illustrated are given by way of example only, and the practice of the invention is not limited to the use of those circuits.

I claim as my invention:

1. A convergence correction system for a cathode-ray tube having a viewing screen, a plurality of electron beam sources, and an associated electron beam deflection system including means for producing horizontal and vertical deflection signals, said correction system comprising means for receiving a deflection signal and for generating therefrom a first plurality of deflection-related signals for correcting beam convergence at a plurality of first locations on said screen and a second plurality of deflection-related signals for correcting beam convergence at screen locations intermediate said first locations, said second plurality of signals having substantially no effect on convergence at said first locations.

2. The convergence correction system of claim 1, wherein said first plurality of signals includes signals for correcting convergence at a central location on said screen and at endpoints of a deflection axis passing through said control location, and said second plurality of signals includes signals having waveforms with substantially zero amplitude at said endpoints and central location.

3. The convergence correction system of claim 1, wherein said first plurality of signals includes signals having a parabolic waveform.

4. The convergence correction system of claim 3, wherein said second plurality of signals includes signals of the form $\pm(X^3-X)$, where X represents the deflection signal from which said signals are generated.

5. The convergence correction system of claim 3, wherein said second plurality of signals includes signals of the form $\pm(X^4-X^2)$, where X represents the deflection signal from which said signals are generated.

6. A convergence correction system for a multigun cathode-ray tube comprising means for providing convergence correction (Cc) signals according to the expression $$Cc = K \pm K1(X^3 - X) \pm K2(X^4 - X^2) \pm \begin{cases} K3X^2 \text{ for } X \leq 0 \\ K4X^2 \text{ for } X \geq 0 \end{cases}$$

wherein K, K1, K2, K3 and K4 are constants, and X is proportional to the magnitude of a deflection signal for the CRT.

* * * * *